United States Patent
Chen et al.

(10) Patent No.: US 10,275,620 B2
(45) Date of Patent: *Apr. 30, 2019

(54) BOOK SORTING METHOD ON THE BASIS OF RSSI SIGNAL VALUE OF RFID TAG

(71) Applicant: NANJING UNIVERSITY, Nanjing (CN)

(72) Inventors: Lijun Chen, Nanjing (CN); Yuanjie Luo, Nanjing (CN); Jia Liu, Nanjing (CN); Linghao Wan, Nanjing (CN); Xi Chen, Nanjing (CN); Afan Zeng, Nanjing (CN); Ying Li, Nanjing (CN); Qingpu Shi, Nanjing (CN); Jiaqi Huang, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/739,036

(22) PCT Filed: Jan. 11, 2017

(86) PCT No.: PCT/CN2017/070929
§ 371 (c)(1),
(2) Date: Dec. 21, 2017

(87) PCT Pub. No.: WO2017/128957
PCT Pub. Date: Aug. 3, 2017

(65) Prior Publication Data
US 2018/0181780 A1    Jun. 28, 2018

(30) Foreign Application Priority Data
Jan. 25, 2016  (CN) .......................... 2016 1 0050963

(51) Int. Cl.
*G06K 7/10* (2006.01)
*G06K 17/00* (2006.01)
*G06Q 10/08* (2012.01)

(52) U.S. Cl.
CPC ..... *G06K 7/10366* (2013.01); *G06K 17/0003* (2013.01); *G06Q 10/087* (2013.01); *G06K 2017/0074* (2013.01)

(58) Field of Classification Search
CPC .......... G06K 17/0022; G06K 17/0025; G06Q 10/087; G06Q 10/0875
(Continued)

(56) References Cited

U.S. PATENT DOCUMENTS 6,655,586 B1 * 12/2003 Back ................... G06K 7/0008
235/375
7,621,448 B2 * 11/2009 Sakurai ................. G06Q 10/10
235/385

(Continued)

*Primary Examiner* — Daniel St Cyr
(74) *Attorney, Agent, or Firm* — CBM Patent Consulting, LLC

(57) ABSTRACT

A book sorting method based on RSSI signal values of RFID tags, including the following steps: reading book RFID tags placed in books by using an RFID device, wherein each tag signal includes: an EPC number EPC of the book RFID tag, the RSSI value r of the book RFID tag, and the time t of reading the book RFID tag, and three attribute values corresponding to one book corresponding to one time are marked as a record; classifying books with the same EPC number of the tags as a category, obtaining a curve chart of the RSSI values of the category of book RFID tags according to a time sequence, and preprocessing the curve chart; and establishing a model; and obtaining the position sequence of each book RFID tag according to the model so as to sort the books.

3 Claims, 2 Drawing Sheets

(58) Field of Classification Search
USPC .............................. 235/385, 380, 383, 472.02
See application file for complete search history.

(56) References Cited

U.S. PATENT DOCUMENTS

2016/0189170 A1* 6/2016 Nadler ................... G06Q 30/02
  705/26.1
2016/0189174 A1* 6/2016 Heath ................ G06Q 30/0201
  705/7.29

* cited by examiner

BOOK SORTING METHOD ON THE BASIS OF RSSI SIGNAL VALUE OF RFID TAG

This application is the U.S. national phase of International Application No. PCT/CN2017/070929 filed on 11 Jan. 2017 which designated the U.S. and claims priority to Chinese Application No. CN 201610050963.1 filed on 25 Jan. 2016, the entire contents of each of which are hereby incorporated by reference.

FIELD OF THE INVENTION

The present invention relates to the field of an RFID technology, and in particular to a book sorting method based on RSSI signal values of RFID tags.

BACKGROUND OF THE INVENTION

RFID (Radio Frequency Identification, radio frequency identification) is a noncontact automatic identification technology, which automatically identifies target objects by radio frequency signals and obtains data without manual intervention. As a wireless version of a bar code, the RFID technology has the advantages of being waterproof, antimagnetic, high temperature resistant, large reading distance, the data encryption and the like that the bar code does not have. The RFID technology has been gradually applied to all the aspects of industrial production and daily life and has made great strides in such fields as factory production, railway operation, warehousing and logistics, valuable goods trade, and identification at present.

At present, the vast majority of libraries still use bar code systems, the existing bar codes have the following disadvantages: 1. the bar code is a "visual technology", a scanner must be operated manually and can only receive the bar code within its view field; 2. the data of the bar code cannot be changed; 3 the bar code has higher requirements on the integrity; 4 the bar code can only identify the producer and the product, and cannot identify the specific commodity; and 5 although the bar code only stores a small amount of data, these data are not encoded, an identification code is universal, so the confidentiality and security of the data still have some deficiencies. The radio frequency identification (RFID) technology can solve all of these problems one by one and bring great convenience for the book management in libraries. RSSI signals of the RFID tags are not applied to book sorting in the libraries at present, compared with the book sorting manner of using phase values of the tags, it is more convenient to adopt the RSSI signals.

SUMMARY OF THE INVENTION

Objective of the invention: the technical problem to be solved by the present invention is to provide a book sorting method based on RSSI signal values of RFID tags in view of the shortcomings in the prior art, in order to automatically identify the arrangement sequence of each layer of books in a library by using RSSI values in the RFID technology.

In order to solve the above technical problems, the present invention discloses a book sorting method based on RSSI (Received Signal Strength Indication, received signal strength indication) signal values of RFID tags, including a book sorting method based on a time-varying rule of the RSSI values of the RFID tags, and the specific steps are as follows:

step 1, reading the information of book RFID tags placed in books by using an RFID device, wherein the information of each book RFID tag includes: an EPC (Electronic Product Code, electronic product code) number EPC of the book RFID tag, the RSSI value r of the book RFID tag, and the time t of reading the book RFID tag, and three attribute values corresponding to one book are marked as a record;

step 2, classifying books with the same EPC number of the book RFID tags as a category, obtaining a curve chart of the RSSI values of the category of book RFID tags according to the sequence of the time t, and preprocessing the curve chart;

step 3, further processing the curve obtained in step 2 to obtain a time-varying rule of the RSSI values of the book RFID tags, and establishing a quadratic curve model; and step 4, obtaining the position sequence of each book RFID tag according to the model so as to sort the books.

In step 1, the distanced between the RFID device and the book and the RSSI value of the book RFID tag has a relationship shown as follows:

$$d=10^{((abs(RSSI)-A)/(10*n))},$$

wherein, abs( ) represents an absolute value function, A represents the RSSI value of the book RFID tag when the distance between the RFID device and the book is 1 meter, n represents an environmental attenuation factor, and the following formula can be obtained from the above formula:

$$RSSI=-\log(10*n*d+A),$$

The above formula indicates that the larger the distance between the RFID device and the book is, the smaller the RSSI value of the book RFID tag is.

Step 2 includes:

step 2-1, dividing the book RFID tags obtained in step 1 according to the EPC numbers of the book RFID tags, classifying the book RFID tags with the same EPC numbers as a category to represent the RSSI values returned by the book RFID tag of one book at different time t;

step 2-2, in each divided category, sorting the RSSI values of each category of book RFID tags according to the sequence of the time t to obtain a curve chart varying with the time t of the RSSI values of one RFID tag; and step 2-3, forming a curve via the changes of the RSSI values of the book RFID tags with the time t, finding the highest wave crest in the curve chart, retaining a segment of continuous curve having the highest wave crest, and eliminating a segment of curve having discrete points or having a wave crest but not the highest wave crest.

Step 3 includes:

performing quadratic curve fitting on the curved retained in step 2 to obtain the time T where the wave crest, namely the highest point, of the fitted curve is located.

Step 4 includes:

sorting the time T of all the book RFID tags obtained in step 3 from small to large, and the obtained time sequence corresponds to the position sequence of each book on a bookshelf.

The RSSI values are applied to book sorting in the library in the present invention for the first time, so that the specific position sequence of each book on a layer of bookshelf can be obtained, and thus librarians and readers can quickly search the books.

Beneficial effects: by the adoption of the method, the objective of sorting the books on each layer of bookshelf is realized, the position sequence of each book can be accurately located, and thus the book reservation precision of the library is improved.

BRIEF DESCRIPTION OF THE DRAWINGS

The present invention will be further described below with reference to the accompanying drawings and specific embodiments, and the advantages of the foregoing and/or other aspects of the present invention will become clearer.

DETAILED DESCRIPTION OF THE EMBODIMENTS

Embodiment 1

The RFID technology consists of three parts: an antenna, a reader and RFID tags. Radio frequency signals emitted by the antennas will be reflected by the tags after arriving at the RFID tags, the reader identifies the RFID tags through received reflected signals, wherein the reflected signals include an RSSI signal. In the present embodiment, the books in a library are sorted by using the RSSI signal values reflected by the tags. The relationship between the distance and the RSSI signal value is as follows:

$$d=10\textasciicircum((abs(RSSI)-A)/(10*n)),$$

d represents the calculated distance, RSSI is received signal intensity (a negative value), A represents the signal intensity when a transmitting end is one meter away from a receiving end, the optimal range is 45-49, n represents an environmental attenuation factor, and is generally 2-5. The following formula can be converted from the above formula:

$$RSSI=-\log(10*n*d+A),$$

The above formula indicates that the greater the distance d is, the smaller the RSSI value is.

Figure 1:
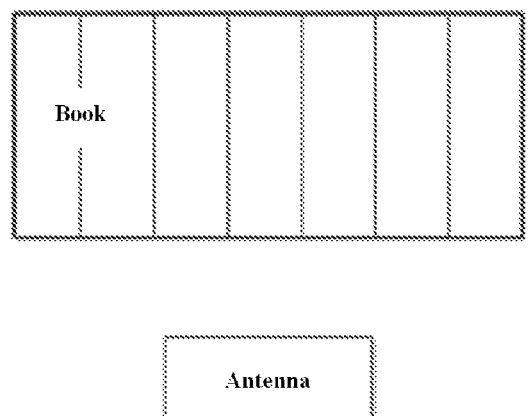
FIG. 1 is a position relationship diagram between an antenna and a bookshelf.

When a layer of books on the bookshelf of the library is sorted, the antenna should be placed in parallel not far away from the book, or otherwise, the RSSI signal values varying with time are not very large for one book, in the present embodiment, the distance from the antenna to the book is set as 10 cm. In a book scanning process, the antenna is slowly moved from one side of the bookshelf to the other side of the bookshelf at a constant speed, and the top view is as shown in FIG. 1.

Figure 2:
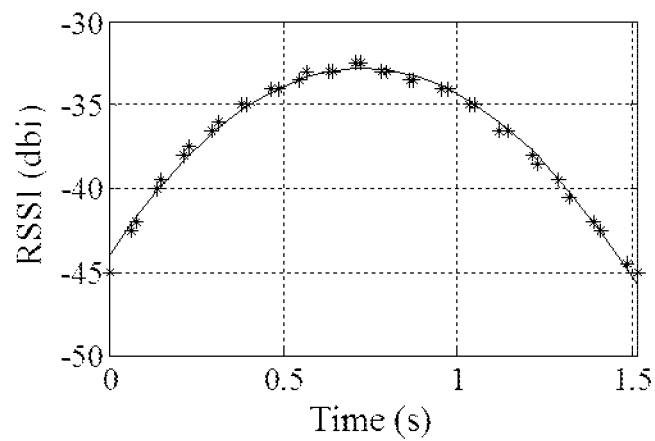
FIG. 2 is a time-varying chart of RSSI values.

Through theoretical analysis and experiments, the time-varying rule of the RSSI signal values is as shown in FIG. 2, the horizontal coordinates represent the time of reading the tags, and the vertical coordinates represent the RSSI signal values returned by the tags.

The following conclusions can be drawn from FIG. 2:

When the antenna is close to the RFID tag, the RSSI values progressively increase; and when the antenna is far away from the RFID tag, the RSSI values progressively decrease;

The present embodiment provides a book sorting method based on RSSI signal values of RFID tags, wherein the data collection process is as follows:

1. An RFID tag is placed in each book, the EPC number of the tag contains an id number of the book, the id number is extracted from the EPC number, and related book information can be inquired by inquiring a background database server.

2. The antenna is slowly moved from one end of the bookshelf to the other end of the bookshelf at a constant speed in a manner of being parallel to the bookshelf, and the distance between the antenna and the book is kept to be 10 cm.

3. The collected information includes the EPC number of the book RFID tag, an RSSI signal value r reflected by the tag, and a time t of collecting the tag signal. The three attribute values corresponding to one book are marked as a record, the collected data should contain the records of all the books on the layer of bookshelf, and all the records are stored in the background database for subsequent analysis.

After the data are collected, the books can be sorted, and the specific process is as follows:

1. The background data records are classified according to the EPC numbers of the tags, and the records with the same EPC numbers classified as a category to represent the information of one book.

2. In each classified category, the RSSI values of each record are sorted according to a time sequence to obtain a time-varying curve chart of the RSSI values of an RFID tag.

3. Due to the influence of environmental factors, the RSSI value corresponding to each book may deviate from the curve at some time, thereby generating some discrete points or small waves, and thus these discrete points need to be processed at first. The RSSI value increases with the time, its value progressively increases at first, and then progressively decreases after arriving at the highest point. The highest wave crest in the curve chart is found, a segment of continuous curve having the highest wave crest is retained, and a segment of curve having discrete points or having a wave crest but not the highest wave crest are eliminated;

4. Some books are thinner, so that the times of reading the RFID tags therein are smaller, such that the points on the preprocessed chart are sparse, and thus the quadratic curve fitting needs to be performed on the preprocessed points.

5. The time corresponding to the highest point is found from the fitted curve, each book corresponds to a time, and these times are sorted from small to large, and the obtained time sequence is the position sequence of the corresponding books on the bookshelf.

Figure 3:
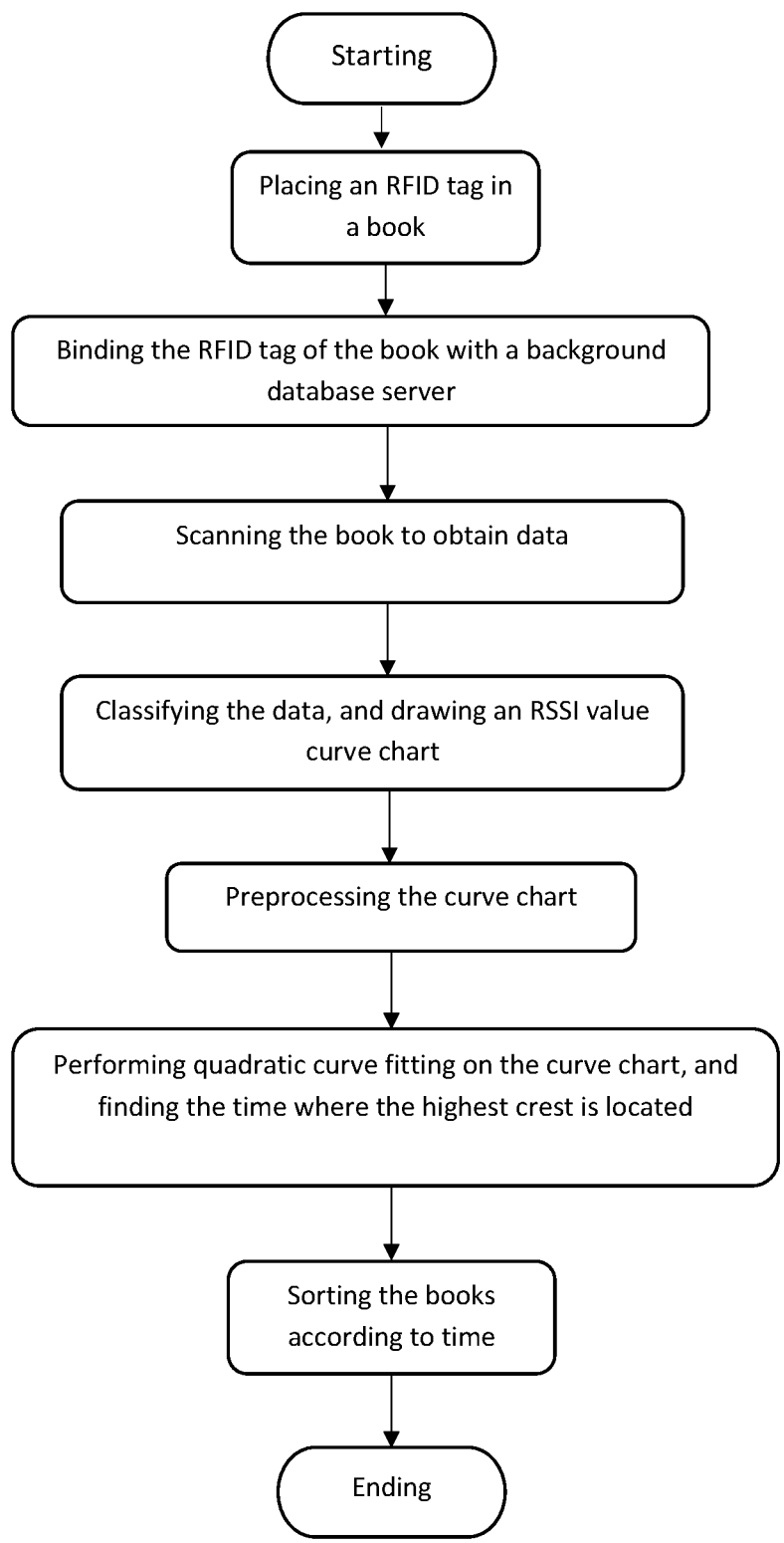
FIG. 3 is a flowchart of an embodiment.

The flow of sorting the books in the library based on the RSSI values in the present embodiment is as shown in FIG. 3.

1. Placing the RFID Tag in the Book, Binding the RFID Tag with the Background Database Server The format of the EPC number of the tag placed in the book is set as follows:

OBCXXXXXXXX000000000

0 represents that the type of the tag is a book RFID tag

B represents a lending state of the book 0 represents un-lent 1 represents lent 2 represents not allowed to be lent C represents length, and the existing encoding length of the book is 8

XXXXX represents the ID number of the book and is obtained by a bar code of the book 00000: a zero filling operation needs to be performed in the absence of double bytes due to the requirements of RFID encoding;

After the EPC number of the tag is obtained, 8 digits starting from the fourth number of the EPC number are extracted to serve as the id number of the book, the background database contains the information of the book and information of the bookshelf where the book is located.

After the id number of the book is extracted from the tag, the book information can be inquired in the background database according to the id number.

2. Scanning the Book to Obtain Data

The books on the bookshelves in the library should be neatly arranged, or otherwise the sorting effect may be affected by the staggered placement of the books. After the books are trimmed, the antenna is placed at a position away from the books about 10 cm in parallel. The antenna cannot be too far away from the books, or otherwise the RSSI values returned by a book will not be significantly different in a movement process, because there is no major change in the distance of the antenna from the book within a certain range. The moving speed should not be too high, if the moving speed is too high, and the times of reading the tags by the antenna are reduced, and the speed is controlled at about 0.1 m/s in the present embodiment.

The obtained data include the EPC number of the RFID tag of the book, the RSSI signal value r returned by the tag, and the time t of reading the tag. The obtained data is stored in the background database for processing in the subsequent steps. Book sorting can be sorting the books while scanning the books, can also be sorting the books after a layer of books on the bookshelf is scanned, and processing is executed according to actual needs. In the present embodiment, the first manner is adopted, that is, sorting the books while scanning the books.

After a part of books on a layer of the bookshelf is scanned, the data of the corresponding books are extracted from the background database for processing, these books are sorted, the obtained result is stored behind the previous result, and then the data in the database are deleted.

3. Classifying Data, and Drawing an RSSI Value Curve Chart

The obtained data are staggered data of multiple books, the data need to be extracted and classified, the data with the same EPC numbers classified as a category to represent the RSSI values returned by the RSSI tag of one book at different time. The classified data are respectively sorted according to a time sequence to obtain a time-varying curve chart of the RSSI values.

4. Preprocessing the Data

Due to the influence of the environmental factors and different thicknesses of the books, resulting in that discrete points or some small wave crests occur in the curve chart obtained in the above step, these are interference factors to the subsequent steps, these points need to be eliminated, and only a segment of continuous curve having the maximum value is retained.

5. Curve Fitting and Book Sorting

The preprocessed curve is not yet the best model for its analysis, quadratic curve fitting needs to be performed on the curve to obtain a complete wave band that increases progressively and then decreases progressively with time, and the time where the maximum value is located is set as T. The obtained $T_1$, $T_2$, $T_3$ ... $T_n$ are sorted in a descending order, and this sequence is the position sequence of the books where the tags are located.

The present invention provides a book sorting method based on RSSI signal values of RFID tags, there are many ways and means for implementing the technical solutions, the foregoing descriptions are merely preferred implementation of the present invention, it should be noted that, for those of ordinary skill in the art, various improvements and modifications can be made without departing from the principle of the present invention, and these improvements and modifications shall also fall within the protection scope of the present invention. The components that are not clearly defined in the present embodiment can be implemented by the prior art.

What is claimed is:

1. A method for sorting RFID (Radio Frequency Identification)-tag books with an RFID device, comprising the following steps:
   1) reading, by the RFID device, the information of book RFID tags placed in books, wherein the information of each book RFID tag comprises: an EPC (Electronic Product Code) number, the RSSI (Received Signal Strength Indicator) value, and a time (named as "t") when the book RFID tag is read, and three attribute values corresponding to one book are marked as a record <EPC number, RSSI value, time t>;
   2) classifying, by a processor, books with the same EPC number of the book RFID tags as a category, obtaining a curve chart of the RSSI values of the category of book RFID tags according to the sequence of the time t, and preprocessing the curve chart:
      dividing the book RFID tags obtained in step 1) according to the EPC numbers of the book RFID tags, classifying the book RFID tags with the same EPC numbers as a category to represent the RSSI values returned by the book RFID tag of one book at different time t;
      in each divided category, sorting the RSSI values of each category of book RFID tags according to the sequence of the time t to obtain a curve chart varying with the time t of the RSSI values of one RFID tag; and
      forming a curve via the changes of the RSSI values of the book RFID tags with the time t, finding the highest wave crest in the curve chart, retaining a segment of continuous curve having the highest wave crest, and eliminating a segment of curve having discrete points or having a wave crest but not the highest wave crest;
   3) further processing, by a processor, the curve obtained in step 2) to obtain a time-varying rule of the RSSI values of the book RFID tags, and establishing a quadratic curve model; and
   4) obtaining the position sequence of each book RFID tag according to the quadratic curve model for sorting the books.

2. The method of claim 1, wherein step 3) comprises: performing quadratic curve fitting on the curved retained in step 2) to obtain the time T where the wave crest, namely the highest point, of the fitted curve is located.

3. The method of claim 2, wherein step 4) comprises: sorting the time T of all the book RFID tags obtained in step 3) from small to large, and the obtained time sequence corresponds to the position sequence of each book on a bookshelf.

* * * * *